United States Patent [19]
Kim

[11] Patent Number: 5,978,665
[45] Date of Patent: *Nov. 2, 1999

[54] RECEIVER FOR EXTENDING THE DYNAMIC RANGE OF A RECEIVED SIGNAL STRENGTH INDICATOR

[75] Inventor: Jong-Hae Kim, Suwon, Rep. of Korea

[73] Assignee: Samsung Electronics Co., Ltd., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,853

[22] Filed: Jul. 3, 1996

[30] Foreign Application Priority Data

Jul. 6, 1995 [KR] Rep. of Korea ................. 95/19782

[51] Int. Cl.$^6$ .................... H04B 1/06; H04B 7/00
[52] U.S. Cl. ........................... 455/249.1; 455/250.1
[58] Field of Search ............... 455/226.1, 226.2, 455/234.1, 234.2, 249.1, 245.1, 254, 232.1, 250.1, 255, 308; 330/51

[56] References Cited

U.S. PATENT DOCUMENTS

| | | | |
|---|---|---|---|
| 5,008,631 | 4/1991 | Scherer et al. | 330/51 |
| 5,369,792 | 11/1994 | Matsumoto et al. | 455/245.1 |
| 5,507,023 | 4/1996 | Sganuma et al. | 455/34.1 |
| 5,603,114 | 2/1997 | Tomita | 455/249.1 |

FOREIGN PATENT DOCUMENTS 5-63663  12/1993  Japan .

*Primary Examiner*—Andrew I. Faile
*Assistant Examiner*—Christopher Onuaku
*Attorney, Agent, or Firm*—Dilworth & Barrese

[57] ABSTRACT

A receiver for use in a cellular communication system includes a first amplifying circuit for amplifying a received signal, an attenuating circuit for selectively attenuating the amplified signal in response to a control signal, a first converting circuit for converting the attenuated signal into an intermediate frequency signal, a second amplifying circuit for amplifying the intermediate frequency signal, a limiter for limiting the amplitude of the amplified intermediate frequency signal, a second converting circuit for converting the current of the amplified intermediate frequency signal or the amplitude-limited intermediate frequency signal into a first direct voltage, a determiner for outputting the control signal for attenuating a received signal strength indicator (RSSI) of the amplified signal by a predetermined strength if the first direct voltage is greater than a predetermined reference voltage and for adding a predetermined voltage with the first direct voltage and then for outputting the added voltage as a second direct voltage, and a detector for detecting the RSSI from the second direct voltage.

11 Claims, 4 Drawing Sheets

RECEIVER FOR EXTENDING THE DYNAMIC RANGE OF A RECEIVED SIGNAL STRENGTH INDICATOR

BACKGROUND OF THE INVENTION

1. Field of the Invention

The present invention relates to a cellular communication system, and more particularly to a receiver for extending the dynamic range of a received signal strength indicator for use in a cellular communication system.

A receiver according to the present invention for extending the dynamic range of a received signal strength indicator is based on Korean Application Serial No. 19782/1995 which is incorporated herein by reference.

2. Description of the Related Art

In general, a received signal strength indicator (RSSI) of a signal received through an antenna is measured in the reception port of a cellular communication system. The measured RSSI is used for selecting a control channel in a standby mode and is used for a hand-off function.

FIG. 1 shows the connection of a circuit in the prior art for measuring the RSSI in the reception port of the conventional cellular communication system. Referring to FIG. 1, a radio signal received through an antenna 2 is amplified by a radio frequency (RF) amplifier 4. The amplified signal is mixed by a first mixer 8 with a signal oscillated by a first local oscillator 6 to generate a first intermediate frequency (IF) signal. The first IF signal is mixed by a second mixer 12 with a signal oscillated by a second local oscillator 20 to generate a second IF signal. The second IF signal is amplified by an IF amplifier 14. The amplitude of the amplified second IF signal is limited by a limiter 16 to be less than or equal to a predetermined magnitude. Generally, the signal output from the limiter 16 is an audio signal supplied to a user.

An arithmetic amplifier 18 converts the current of a signal output from the IF amplifier 14 and limiter 16 into a direct voltage (DV) and outputs the same. It is possible to measure the RSSI indicating the strength of the signal received through the reception port of the cellular communication system using the output DV. The following Table 1 indicates exemplary DV outputs from the arithmetic amplifier 18 in correspondence with the strength of the signal input to the IF processing unit 10.

TABLE 1

| RSSI of IF processing unit [dBm] | DV [V] |
|---|---|
| −120 | 0.5 |
| −110 | 1.0 |
| −100 | 1.5 |
| −90 | 2.0 |
| −80 | 2.5 |
| −70 | 3.0 |
| −60 | 3.5 |
| −50 | 4.0 |
| −40 | 4.5 |
| −30 | 5.0 |
| −20 | 5.0 |
| −10 | 5.0 |

Referring to the above Table 1, if the RSSI of the signal input to the second mixer 12 of the IF processing unit 10 is −120 dBm, the DV level output from the arithmetic amplifier 18 is 0.5 V. If the RSSI of the signal input to the second mixer 12 of the IF processing unit 10 is −100 dBm, the DV level output from the arithmetic amplifier 18 is 1.5 V. If the RSSI of the signal input to the second mixer 12 of the IF processing unit 10 is −30 dBm, the DV level output from the arithmetic amplifier 18 is 5.0 V.

FIG. 2 shows an RSSI characteristic curve of the prior art IF processing unit 10 and of the overall reception port in the cellular communication system as indicated in Table 1. Referring to Table 1, the dynamic range of the RSSI of the IF processing unit 10 having the second mixer 12, IF amplifier 14, limiter 16 and arithmetic amplifier 18 is about 90 dB (−30 dBm to −120 dBm), as shown by a solid line G1 of FIG. 2. In other words, when the RSSI of the signal input to the second mixer 12 of the IF processing unit 10 is −30 dBm to −120 dBm, the RSSI can be measured. If the RSSI of the signal input to the second mixer 12 of the IF processing unit 10 is greater than −20 dBm or less than −120 dBm, the RSSI cannot be measured. The interval in which the RSSI can be measured is called an RSSI dynamic range. The interval in which the RSSI cannot be measured is called an RSSI saturated region.

Since the gain of the RF amplifier 4 and first mixer 8 disposed in front of the IF processing unit 10 is about 20 dB to receive the band frequency (for example, 869 MHz to 894 MHz) of the cellular communication system, the RSSI dynamic range of the overall reception port of the cellular communication system shown in FIG. 1 is decreased to about 70 dB, as shown by a single dashed line G2 of FIG. 2. In other words, since the RSSI characteristic curve is moved to the RSSI saturated region by 20 dB, which is the gain of the components disposed in front of the IF processing unit 10, the RSSI dynamic range of the overall reception port of the cellular communication system corresponds to the interval of −30 dBm to −100 dBm. In other words, only when the RSSI of the signal received through the antenna 2 corresponds to the interval of −30 dBm to −100 dBm, the RSSI can be measured.

Also, even if the signal having the RSSI corresponding to the interval of −30 dBm to −100 dBm is input, the gain of the RF amplifier and first mixer should be increased to improve the reception sensitivity of the reception port of the cellular communication system. In such an implementation, the RSSI dynamic range would be much more decreased. Thus, a control channel cannot be selected in a standby mode of the reception port, nor can be allowed in using a hand-off function.

SUMMARY OF THE INVENTION

It is therefore an object of the present invention to provide a receiver for extending an RSSI dynamic range for use in a cellular communication system.

It is another object of the present invention to provide a receiver with an improved reception sensitivity for use in a cellular communication system.

In accordance with the above objects, the present invention is directed to a receiver of a cellular communication system for determining the RSSI in advance, selectively attenuating a received signal in correspondence with the determined strength indicated by the RSSI, and applying the attenuated signal to a mixer or directly applying the attenuated signal to the mixer without the attenuated signal passing through an RF amplifier.

Also, according to another aspect of the present invention, a receiver is disclosed for use in a cellular communication system having: a first amplifier for amplifying a received signal; an attenuating circuit for selectively attenuating the amplified signal in response to a control signal; a first converting circuit for converting the attenuated signal into an intermediate frequency (IF) signal; a second amplifier for amplifying the IF signal; a limiter for limiting the amplitude of the amplified IF signal; a second converting circuit for converting the current of the amplified IF signal or the amplitude-limited IF signal into a first direct voltage; a determiner for determining whether to output the control signal for attenuating a received signal strength indicator (RSSI) of the amplified signal by a predetermined strength if the first direct voltage is greater than a predetermined reference voltage to add a predetermined voltage with the first direct voltage to generate an added voltage, and to output the added voltage as a second direct voltage; and a detector for detecting the RSSI from the second direct voltage.

According to another aspect of the present invention, a receiver is disclosed for use in a cellular communication system comprising: a circuit for increasing a received signal strength indicator (RSSI); a first converting circuit for converting the RSSI-increased signal into an intermediate frequency (IF) signal; an amplifier for amplifying the IF signal; a limiter for limiting the amplitude of the amplified IF signal; a second converting circuit for converting the current of the amplified IF signal or the amplitude-limited IF signal into a first direct voltage; a determiner for determining whether to output the control signal for selecting the received signal if the first direct voltage is greater than a predetermined reference voltage, to add a predetermined correction voltage with the first direct voltage to generate an added voltage and to output the added voltage as a second direct voltage; and a detector for detecting the RSSI from the second direct voltage.

BRIEF DESCRIPTION OF THE DRAWINGS

These and various other features and advantages of the present invention will be readily understood with reference to the following detailed description taken in conjunction with the accompanying drawings, in which.

DETAILED DESCRIPTION OF THE PREFERRED EMBODIMENTS

Figure 1:
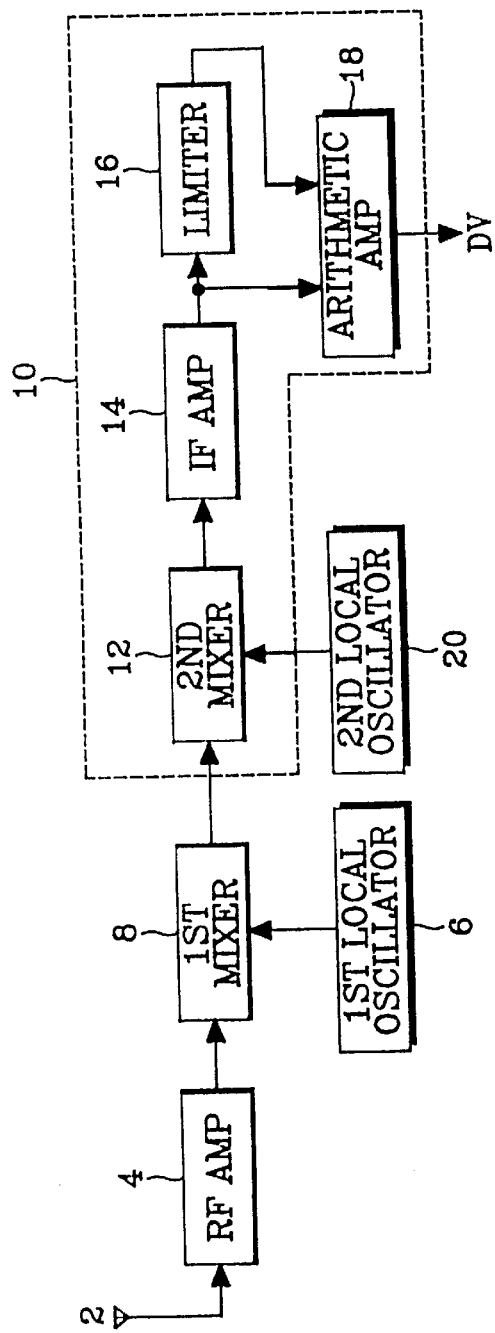
FIG. 1 is a block diagram of a circuit in the prior art for measuring an RSSI in a conventional cellular communication system.
Figure 4:
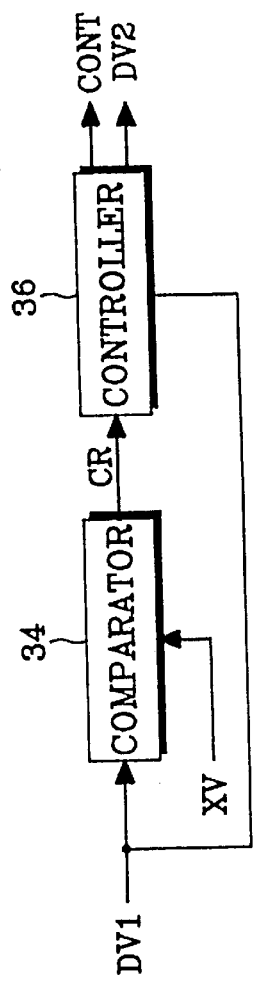
FIG. 4 is a detailed block diagram of a determiner shown in FIG. 3.
Figure 2:
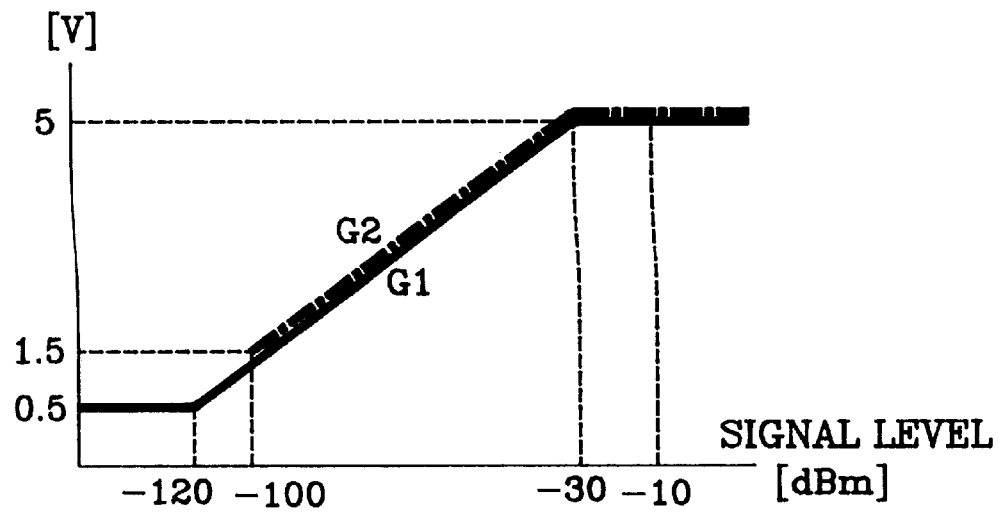
FIG. 2 shows a characteristic curve for the RSSI measured by the circuit shown in FIG. 1.
Figure 3:
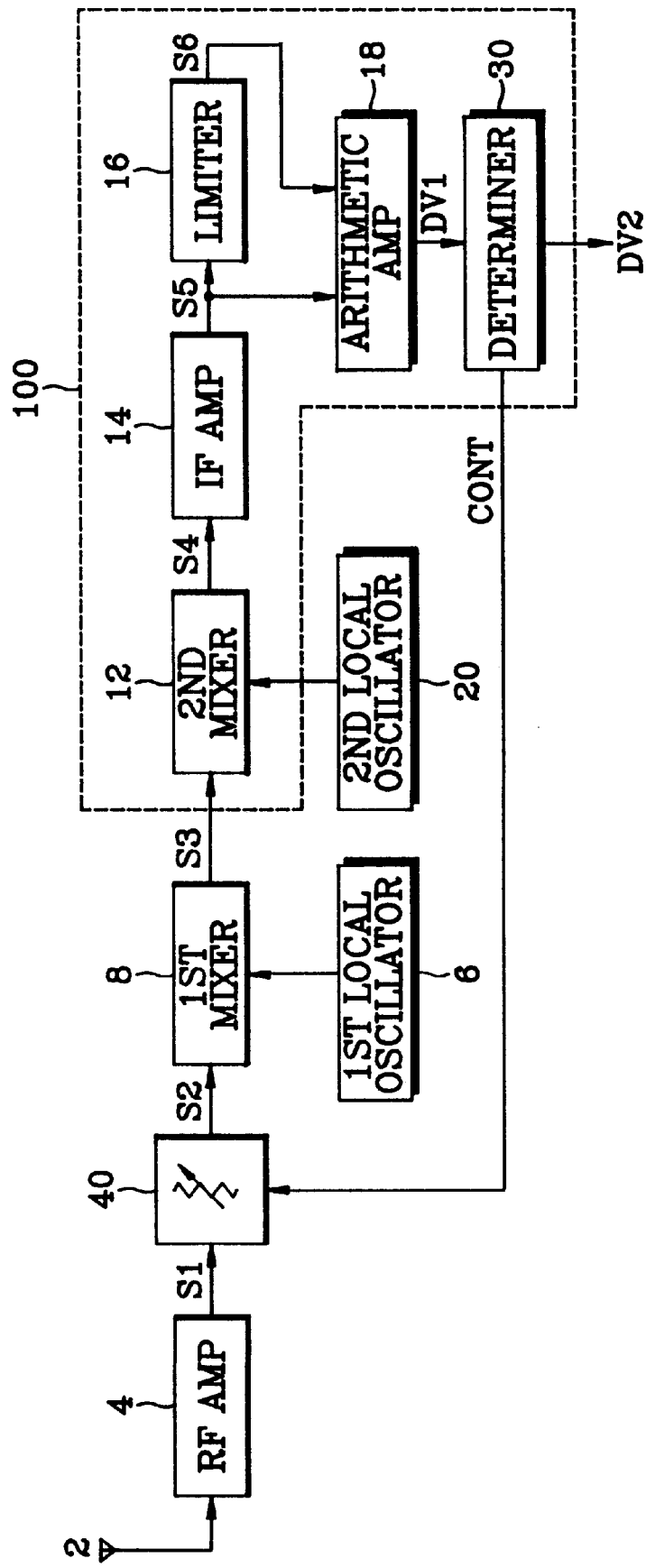
FIG. 3 is a block diagram of a circuit for measuring an RSSI in a cellular communication system according to a first embodiment of the present invention.

Referring to FIGS. 3 and 4, the present invention includes a processing unit 100 for processing IF signals generated from a radio signal. The radio signal received from an antenna 2 is amplified by a radio frequency (RF) amplifier 4 which increases the strength of the radio signal by 20 dB. The strength of the amplified signal S1 output by the RF amplifier 4 is attenuated by an attenuator 40 selectively operating in response to a control signal CONT output from a determiner 30, which is a circuit as described below with reference to FIG. 4. In response to the control signal CONT, the strength of the radio signal is increased by 20 dB by the RF amplifier 4 and the amplified signal S1 is attenuated by 20 dB.

The attenuated signal S2 output from the attenuator 40 is mixed by a first mixer 8 with a signal oscillated by a first local oscillator 6 to generate a first IF signal S3. The first IF signal S3 is input to the IF processing unit 100, in which the signal S3 is mixed by a second mixer 12 with a signal oscillated by a second local oscillator 20 to generate a second IF signal S4. The second IF signal S4 is then amplified by an IF amplifier 14 to generate an amplified signal S5. The amplitude of the amplified signal S5 is limited by a limiter 16 to be less than or equal to a predetermined magnitude. An arithmetic amplifier 18 converts the signal S5 output from the IF amplifier 14 or, alternatively, the current of the signal S6 output by the limiter 16 into a first direct voltage DV1 and outputs the same to the determiner 30.

As shown in an illustrative embodiment in FIG. 4, the determiner 30 includes a comparator 34 and a controller 36. The comparator 34 of the determiner 30 compares the first direct voltage DV1 with a predetermined reference voltage XV. The comparator 34 outputs a comparison signal CR being high (using positive logic) if the first direct voltage DV1 is greater than the predetermined reference voltage XV. Then, the controller 36 outputs a control signal CONT being high, in response to the high comparison signal CR, to the attenuator 40, and outputs a low control signal CONT to the attenuator 40 if the comparison signal CR is low. Also, the controller 36 outputs a second direct voltage DV2 equal to the first direct voltage DV1 if the comparison signal is high; otherwise, the controller 36 adds a correction voltage of about one volt (1 V) to the first direct voltage DV1 to generate the added voltage as the second direct voltage DV2 if the comparison signal is low.

The attenuator 40 attenuates the RSSI of the signal S1 output from the RF amplifier 4 if the control signal CONT from the controller 36 is high, and the RSSI of the signal S1 output from the RF amplifier 4 is attenuated by 20 dB and is output. If the control signal CONT from the controller 36 is low, the signal S1 output from the RF amplifier 4 is output without modification.

The following Table 2 lists illustrative values of the first direct voltage DV1 and the second direct voltage DV2 output from the arithmetic amplifier 18 and determiner 30, respectively, in correspondence with the RSSI of each stage of the signal S1 output from the RF amplifier 4 and the signal S2 output from the attenuator 40.

TABLE 2

| RSSI of S1 [dBm] | DV1 [V] (INITIAL) | RSSI of S2 [dBm] | DV1 [V] (FINAL) | DV2 [V] |
|---|---|---|---|---|
| −100 | 1.5 | −100 | 1.5 | 1.5 |
| −90 | 2.0 | −90 | 2.0 | 2.0 |
| −80 | 2.5 | −80 | 2.5 | 2.5 |
| −70 | 3.0 | −70 | 3.0 | 3.0 |
| −60 | 3.5 | −80 | 2.5 | 3.5 |
| −50 | 4.0 | −70 | 3.0 | 4.0 |
| −40 | 4.5 | −60 | 3.5 | 4.5 |
| −30 | 5.0 | −50 | 4.0 | 5.0 |
| −20 | 5.0 | −40 | 4.5 | 5.5 |
| −10 | 5.0 | −30 | 5.0 | 6.0 |
| 0 | 5.0 | −20 | 5.0 | 6.0 |
| +10 | 5.0 | −10 | 5.0 | 6.0 |

If the RSSI of the signal S1 output from the RF processor 100 is greater than −60 dBm, the attenuation of about 20 dB does not affect the reception efficiency. Therefore, as shown in Table 2, the attenuator 40 performs the attenuation of about 20 dB when the signal S1 output from the RF amplifier 4 has an RSSI greater than −60 dBm.

Referring to Table 2, if the RSSI of the signal S1 output from the RF amplifier 4 varies as shown in the first column of Table 2, the arithmetic amplifier 18 outputs an initial first direct voltage DV1 as shown in the second column thereof. At this time, the comparator 34 of the determiner 30 outputs a high comparison signal CR if the first direct voltage DV1 is greater than a predetermined reference voltage XV, for example, 3.5 V. The controller 36 outputs a high or low control signal CONT in response to the comparison signal CR. The attenuator 40 selectively attenuates the signal S1 output from the RF amplifier 4 in response to the high or low value of the control signal CONT, which varies the RSSI of the signal S2 as shown in the third column of Table 2. When the signal S2 is output, the arithmetic amplifier 18 outputs the final direct voltage DV1 as shown in the fourth column of Table 2. The controller 36 of the determiner 30 outputs the second direct voltage DV2 as shown in the fifth column of Table 2.

For example, if the RSSI of the signal S1 output from the RF amplifier 4 is −20 dBm, the arithmetic amplifier 18 outputs an initial first direct voltage DV1 of 5.0 V, which is greater than the reference voltage XV (e.g. 3.5 V). Thus, the comparator 34 of the determiner 30 outputs a high comparison signal CR. The controller 36 outputs the high control signal CONT in response to the high comparison signal CR of a high level. The attenuator 40 attenuates by 20 dB the signal S1 having the RSSI of −20 dBm to output a signal S2 having the RSSI of −40 dBm to the first mixer 8. The arithmetic amplifier 18 outputs the first direct voltage DV1 of 4.5 V corresponding to the signal S2 having the RSSI of −40 dBm. The controller 36 of the determiner 30 adds 1 V to the initial first direct voltage DV1 and outputs the second direct voltage DV2 of 5.5 V. An RSSI detector (not shown) detects the level of the signal S1 output from the RF amplifier 4 to be −20 dBm in response to the output of the second direct voltage DV2 of 5.5 V from the controller 36 of the determiner 30.

Figure 5:
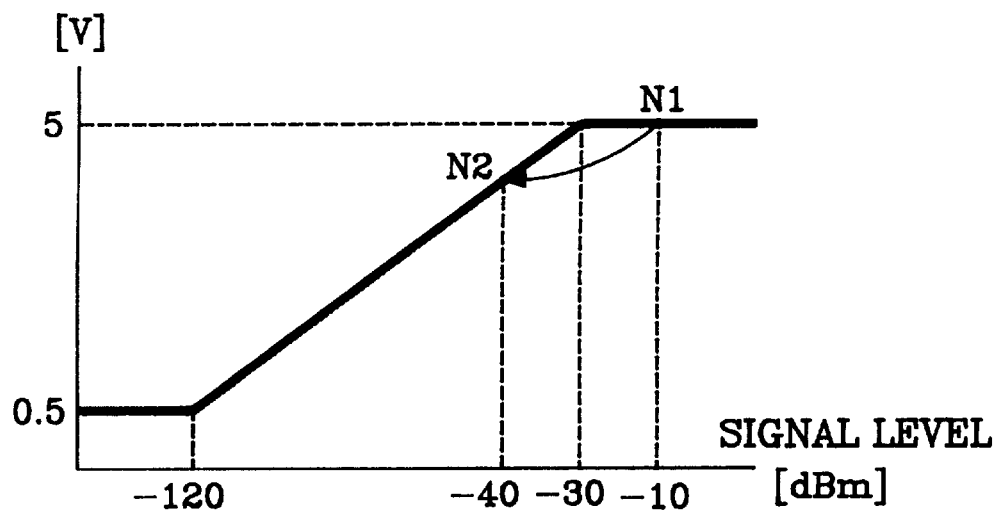
FIG. 5 shows a characteristic curve for the RSSI measured by the circuit shown in FIG. 3.

FIG. 5 shows a characteristic curve for the RSSI measured by the circuit shown in FIG. 3. Referring to FIG. 5, if the signal S1 output from the RF amplifier 4 is −20 dBm, the signal S1 corresponds to the RSSI saturated region. However, the RSSI of the signal S2 output from the attenuator 40 is attenuated to −40 dBm to correspond to the RSSI dynamic range. In other words, the RSSI dynamic range is extended.

Referring to Table 2, if the signal S1 is output to the first mixer 8 without attenuation, the signal S1 having the RSSI greater than −20 dBm corresponds to the RSSI saturated region. However, if the RSSI of the S1 is determined in advance and then is selectively attenuated due to the signal S1 corresponding to the RSSI saturated region from the range from the RSSI of −10 dBm, the RSSI dynamic range is extended.

In a cellular communication system according to the first embodiment of the present invention, the RSSI is selectively attenuated using the attenuator 40. However, the present invention can be implemented without using the attenuator 40.

Figure 6:
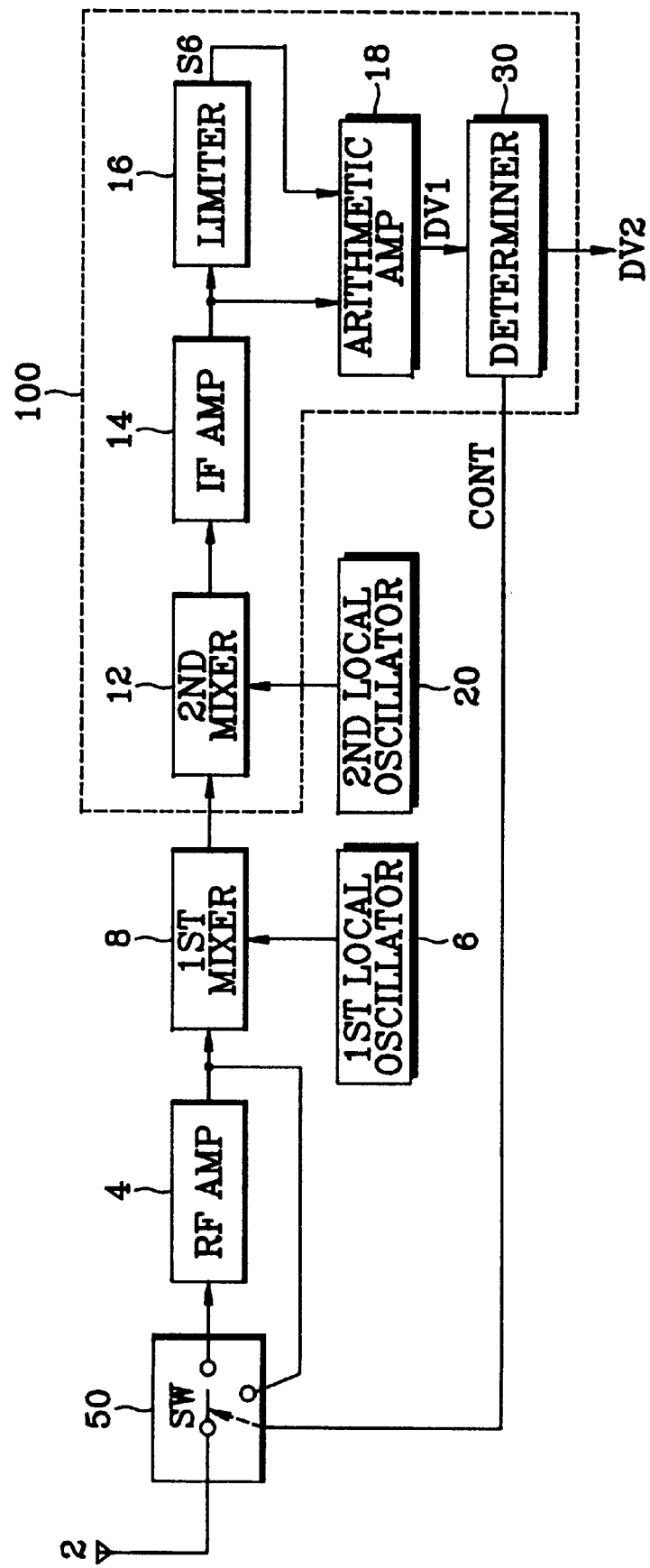
FIG. 6 is a block diagram of a circuit for measuring an RSSI in a cellular communication system according to a second embodiment of the present invention.

FIG. 6 is a block diagram of a circuit for measuring an RSSI in a cellular communication system according to a second embodiment of the present invention.

An additional feature of the second embodiment of the present invention is a switch 50. The switch 50 operates so that a signal received through the antenna 2 is directly applied to the first mixer 8 when the control signal CONT from the determiner 30 is high. However, when the control signal CONT from the determiner 30 is low, the switch 50 operates so that the signal received through the antenna 2 is applied to the RF amplifier 4. The operation of the components other than the first mixer 8 is performed in the same manner as that of the components of the first embodiment of the present invention, described above with reference to FIG. 3.

As described above, the RSSI dynamic range can be extended by implementing a cellular communication system for determining the RSSI in advance, selectively attenuating a received signal in correspondence with the determined RSSI, and applying the attenuated signal to a mixer or directly applying the attenuated signal to the mixer without passing through an RF amplifier. Accordingly, the measuring range of a received signal can be extended and the cellular communication system having improved reception sensitivity can be implemented.

The operation of the present invention has been describe with reference to positive logic values. It is to be understood that negative logic values may also be implemented.

Therefore, it should be understood that the present invention is not limited to the particular embodiment disclosed herein as the best mode contemplated for carrying out the present invention, and also that the present invention is not limited to the specific embodiments described in this specification.

What is claimed is:

1. A receiver for use in a cellular communication system, the receiver having a dynamic range and a saturation region associated therewith, comprising:

a first amplifying circuit for amplifying a received signal to provide an amplified signal;

an attenuating circuit for selectively attenuating said amplified signal in response to a control signal so as to prevent said received signal from entering said saturation region of said receiver;

a first converting circuit for converting said attenuated signal into an intermediate frequency signal;

a second amplifying circuit for amplifying said intermediate frequency signal;

a second converting circuit for converting a corresponding current of said amplified intermediate frequency signal into a first direct voltage;

a determiner for receiving said first direct voltage and generating said control signal as a function of the amplitude of said first direct voltage to selectively control attenuation of said attenuating circuit, and also for generating a second direct voltage which is a function of the amplitude of said first direct voltage and the selective attenuation of said attenuating circuit, said second direct voltage being a received signal strength indicator (RSSI) which is outputted by said determiner to provide a measurement of an actual strength of the received signal for use by the cellular communication system, thereby increasing said dynamic range of said receiver and providing a measurement of the actual strength of the received signal even when said received signal is attenuated by said attenuating circuit;

wherein said determiner comprises circuit means for determining whether said first direct voltage is above a predetermined voltage, for outputting said control signal to attenuate said received signal by a predetermined amount if said first direct voltage is above said predetermined voltage, and for generating said second direct voltage at a first level corresponding to said first direct voltage if said first direct voltage is less than said predetermined voltage and said attenuator is controlled to provide minimum attenuation, and at a second level corresponding to the sum of said first direct voltage and a correction voltage if said attenuator is controlled to attenuate said received signal by said predetermined amount.

2. The receiver as claimed in claim 1 further comprising:

a limiter for limiting the amplitude of said amplified intermediate frequency signal;

wherein the second converting circuit converts a corresponding current of said amplitude-limited amplified intermediate frequency signal into said first direct voltage.

3. A receiver for use in a cellular communication system, comprising:

a first amplifying circuit for amplifying a received signal to provide an amplified signal;

an attenuating circuit for selectively attenuating said amplified signal in response to a control signal;

a first converting circuit for converting said attenuated signal into an intermediate frequency signal;

a second amplifying circuit for amplifying said intermediate frequency signal;

a second converting circuit for converting a corresponding current of said amplified intermediate frequency signal into a first direct voltage;

a determiner for receiving said first direct voltage and generating said control signal as a function of the amplitude of said first direct voltage to control attenuation of said attenuating circuit so as to increase dynamic range of the receiver, and also for generating a second direct voltage which is a function of the amplitude of said first direct voltage and the attenuation of said attenuating circuit, said second direct voltage being a received signal strength indicator (RSSI) representing a measurement of the strength of the received signal for use by the cellular communication system;

said determiner comprising a comparator for comparing said first direct voltage with a predetermined reference voltage, and a controller operatively coupled to said comparator, wherein if said first direct voltage is greater than said predetermined reference voltage, said controller outputs said control signal for attenuating said received signal by a predetermined amount and generates said second direct voltage as the sum of a correspondingly attenuated said first direct voltage and a predetermined correction voltage, said controller otherwise generating said second direct voltage substantially as said first direct voltage.

4. The receiver as claimed in claim 1, wherein:

the determiner outputs said first direct voltage as said second direct voltage if said first direct voltage is less than a predetermined reference voltage.

5. The receiver as claimed in claim 1 further comprising:

a detector for detecting said RSSI from said second direct voltage.

6. A receiver for use in a cellular communication system, the receiver having a dynamic range and a saturation region associated therewith, comprising:

a first amplifying circuit for amplifying a received signal input thereto to provide an amplified received signal;

a switch, responsive to a control signal, for selectively inputting the received signal to the first amplifying circuit or to a bypass circuit path bypassing the first amplifying circuit so as to prevent said received signal from entering said saturation region of said receiver;

a first converting circuit for converting one of the amplified received signal or the received signal of the bypass circuit path into an intermediate frequency signal;

a second amplifying circuit for amplifying said intermediate frequency signal;

a second converting circuit for converting a corresponding current of said amplified intermediate frequency signal into a first direct voltage;

a determiner for outputting said control signal for selectively inputting said received signal to the first amplifying circuit or to the bypass circuit path in response to the first direct voltage and for generating a second direct voltage as a function of the first direct voltage and the circuit path taken by the received signal in accordance with the control signal and the switch, said second direct voltage being outputted by said determiner to provide a measurement of an actual strength of the received signal for use by the cellular communication system, thereby increasing said dynamic range of said receiver and providing a measurement of the actual strength of the received signal even when said received signal is attenuated by said attenuating circuit;

wherein said determiner comprises circuit means for determining whether said first direct voltage is above a predetermined voltage, for outputting said control signal to route said received signal to said bypass circuit path if said first direct voltage is above said predetermined voltage, and for generating said second direct voltage at a first level corresponding to said first direct voltage if said first direct voltage is less than said predetermined voltage and said received signal is routed to said amplifying circuit, and at a second level corresponding to the sum of said first direct voltage and a correction voltage if said bypass circuit path is selected.

7. The receiver as claimed in claim 6, wherein said predetermined voltage is a reference voltage, and said circuit means comprises:

a comparator for comparing the magnitude of said first direct voltage with the magnitude of said reference voltage; and a controller for outputting said control signal and said second direct voltage.

8. The receiver as claimed in claim 6 further comprising:

a limiter for limiting the amplitude of said amplified intermediate frequency signal; and the second converting circuit converts a corresponding current of said amplitude-limited amplified intermediate frequency signal into said first direct voltage.

9. The receiver as claimed in claim 6 further comprising:

a detector for detecting said RSSI from said second direct voltage.

10. The receiver as claimed in claim 3 further comprising:

a limiter for limiting the amplitude of said amplified intermediate frequency signal;

wherein the second converting circuit converts a corresponding current of said amplitude-limited amplified intermediate frequency signal into said first direct voltage.

11. The receiver as claimed in claim 3 further comprising:

a detector for detecting said RSSI from said second direct voltage.

* * * * *